US008769397B2

(12) United States Patent
Tsun et al.

(10) Patent No.: US 8,769,397 B2
(45) Date of Patent: Jul. 1, 2014

(54) EMBEDDING MACROS IN WEB PAGES WITH ADVERTISEMENTS

(75) Inventors: Stephen Tsun, Cupertino, CA (US); Jonathan Nikfarjam, Roslyn, NY (US)

(73) Assignee: Google Inc., Mountain View, CA (US)

( * ) Notice: Subject to any disclaimer, the term of this patent is extended or adjusted under 35 U.S.C. 154(b) by 1117 days.

(21) Appl. No.: 12/147,015

(22) Filed: Jun. 26, 2008

(65) Prior Publication Data
US 2009/0327858 A1   Dec. 31, 2009

(51) Int. Cl.
*G06F 17/00*   (2006.01)

(52) U.S. Cl.
USPC ........... 715/234; 715/237; 709/220; 709/224; 717/106; 705/14.55

(58) Field of Classification Search
USPC .................. 715/234–253; 709/201–220, 224; 717/106; 705/14.55
See application file for complete search history.

(56) References Cited

U.S. PATENT DOCUMENTS

| 2002/0023112 | A1  | 2/2002  | Avital |
| 2002/0107892 | A1* | 8/2002  | Chittu et al. .................. 707/514 |
| 2002/0165954 | A1  | 11/2002 | Eshghi et al. |
| 2003/0135819 | A1  | 7/2003  | Lakhdhir et al. |
| 2005/0091186 | A1* | 4/2005  | Elish ................................. 707/1 |
| 2005/0149576 | A1* | 7/2005  | Marmaros et al. ............ 707/200 |
| 2005/0273388 | A1* | 12/2005 | Roetter ............................ 705/14 |
| 2006/0123340 | A1  | 6/2006  | Bailey et al. |
| 2006/0271669 | A1  | 11/2006 | Bouguenon et al. |
| 2006/0287920 | A1* | 12/2006 | Perkins et al. .................. 705/14 |
| 2007/0027754 | A1  | 2/2007  | Collins et al. |
| 2007/0234288 | A1* | 10/2007 | Lindsey et al. ............... 717/117 |
| 2008/0010112 | A1* | 1/2008  | Kniaz et al. ..................... 705/14 |
| 2008/0010629 | A1* | 1/2008  | Berg et al. ..................... 717/116 |
| 2008/0097830 | A1* | 4/2008  | Kim ................................ 705/10 |
| 2008/0140502 | A1* | 6/2008  | Birnholz et al. ................ 705/10 |

(Continued)

FOREIGN PATENT DOCUMENTS

| GB | 2329310 A    | 3/1999 |
| JP | 2004070716 A | 3/2004 |

(Continued)

OTHER PUBLICATIONS

International Preliminary Report on Patentability dated Jan. 5, 2011 issued in equivalent PCT Application No. PCT/US2009/048777, 6 pages.

(Continued)

*Primary Examiner* — Quoc A Tran
(74) *Attorney, Agent, or Firm* — Armstrong Teasdale LLP

(57) ABSTRACT

The present disclosure is directed to a system and method for embedding macros in Web pages with advertisements. In some implementations, a method includes receiving a snippet embedded in a remote Web page. Rules for embedding one or more macros in the snippet are identified. The one or more macros are associated with archiving user actions associated with an advertisement presented in the Web page. A format of the snippet is determined from a plurality of identifiable formats based, at least in part, on the rules. The one or more macros are automatically embedded in the snippet in accordance with rules associated with the snippet format.

21 Claims, 3 Drawing Sheets

(56) References Cited

U.S. PATENT DOCUMENTS

| | | | |
|---|---|---|---|
| 2008/0235042 A1* | 9/2008 | Boyd et al. | 705/1 |
| 2008/0275884 A1* | 11/2008 | Yoshida et al. | 707/10 |
| 2008/0281898 A1* | 11/2008 | Pesce et al. | 709/201 |
| 2009/0037254 A1* | 2/2009 | Colando | 705/10 |
| 2009/0094108 A1* | 4/2009 | Bhandari et al. | 705/14 |
| 2009/0254459 A1* | 10/2009 | Williams et al. | 705/27 |
| 2010/0063878 A1* | 3/2010 | Bachet et al. | 705/14.49 |
| 2012/0036449 A1* | 2/2012 | Minnis et al. | 715/745 |

FOREIGN PATENT DOCUMENTS

| | | |
|---|---|---|
| JP | 2005352807 A | 12/2005 |
| WO | 2005038575 A2 | 4/2005 |
| WO | 2009051939 A2 | 4/2009 |

OTHER PUBLICATIONS

Notification of Transmittal of the International Search Report and the Written Opinion of the International Searching Authority, or Declaration (4 pages); International Search Report (3 pages); and Written Opinion of the International Searching Authority (4 pages), mailed Feb. 5, 2010, for related international application PCT/US2009/048777.

Supplementary European Search Report for related application No. 09771099.0-1955/2311001 dated Jul. 31, 2013, pp. 1-4.

Atterer, Richard et al., Knowing the User's Every Move—User Activity Tracking for Website Usability Evaluation and Implicit Interaction, World Wide Web Conference Committee 2006, May 23-26, 2006, pp. 203-212, Edinburgh, Scotland.

JP Office Action for related application No. 2011-516698 dated May 10, 2013, pp. 1-3.

* cited by examiner

```
<script>
var gnEbMinZIndex = 10000;
var gfEbInIframe = false;
var gEbAd = new Object();
gEbAd.nFlightID = 123456;
//Interactions
gEbAd.interactions = new Object();
gEbAd.interactions["_eyeblaster"] = "ebN=%c;"
</script>
<script src="http://ds.serving-sys.com/BurstingScript/ebServing_123456.js"></script>
```

FIG. 2A

```
<script>
var gnEbMinZIndex = 10000;
var gfEbInIframe = false;
var gEbAd = new Object();
gEbAd.nFlightID = 123456;
//Interactions
gEbAd.interactions=new Object();
gEbAd.interactions["_eyeblaster"] = "ebN=%%CLICK_URL_UNESC%%";
</script>
<script src="http://ds.serving-sys.com/BurstingScript/ebServing_123456.js"></script>
```

FIG. 2B

EMBEDDING MACROS IN WEB PAGES WITH ADVERTISEMENTS

TECHNICAL FIELD

This invention relates to advertising.

BACKGROUND

Content delivery over the internet continues to improve every day. Computer users can receive e-mail, news, games, entertainment, music, books, and web pages-all with a simple Internet connection (and with improved quality on a broadband connection). Internet users also have access to a plethora of services such as maps, shopping links, images, blogs, local search, satellite images, group discussions, hosted content, and e-mail. These service providers may archive users' interactions with such services to determine associated metrics and/or modify these services based on such interactions to further enhance the user experience.

SUMMARY

The present disclosure is directed to a system and method for embedding macros in Web pages with advertisements. In some implementations, a method includes receiving a snippet embedded in a remote Web page. Rules for embedding one or more macros in the snippet are identified. The one or more macros are associated with archiving user actions associated with an advertisement presented in the Web page. A format of the snippet is determined from a plurality of identifiable formats based, at least in part, on the rules. The one or more macros are automatically embedded in the snippet in accordance with rules associated with the snippet format.

The details of one or more implementations of the invention are set forth in the accompanying drawings and the description below. Other features, objects, and advantages of the invention will be apparent from the description and drawings, and from the claims.

DESCRIPTION OF DRAWINGS

FIGS. 2A and 2B are block diagrams illustrating an example snippet and modified snippet of FIG. 1 in accordance with some implementations of the present disclosure.

DETAILED DESCRIPTION

Figure 1:
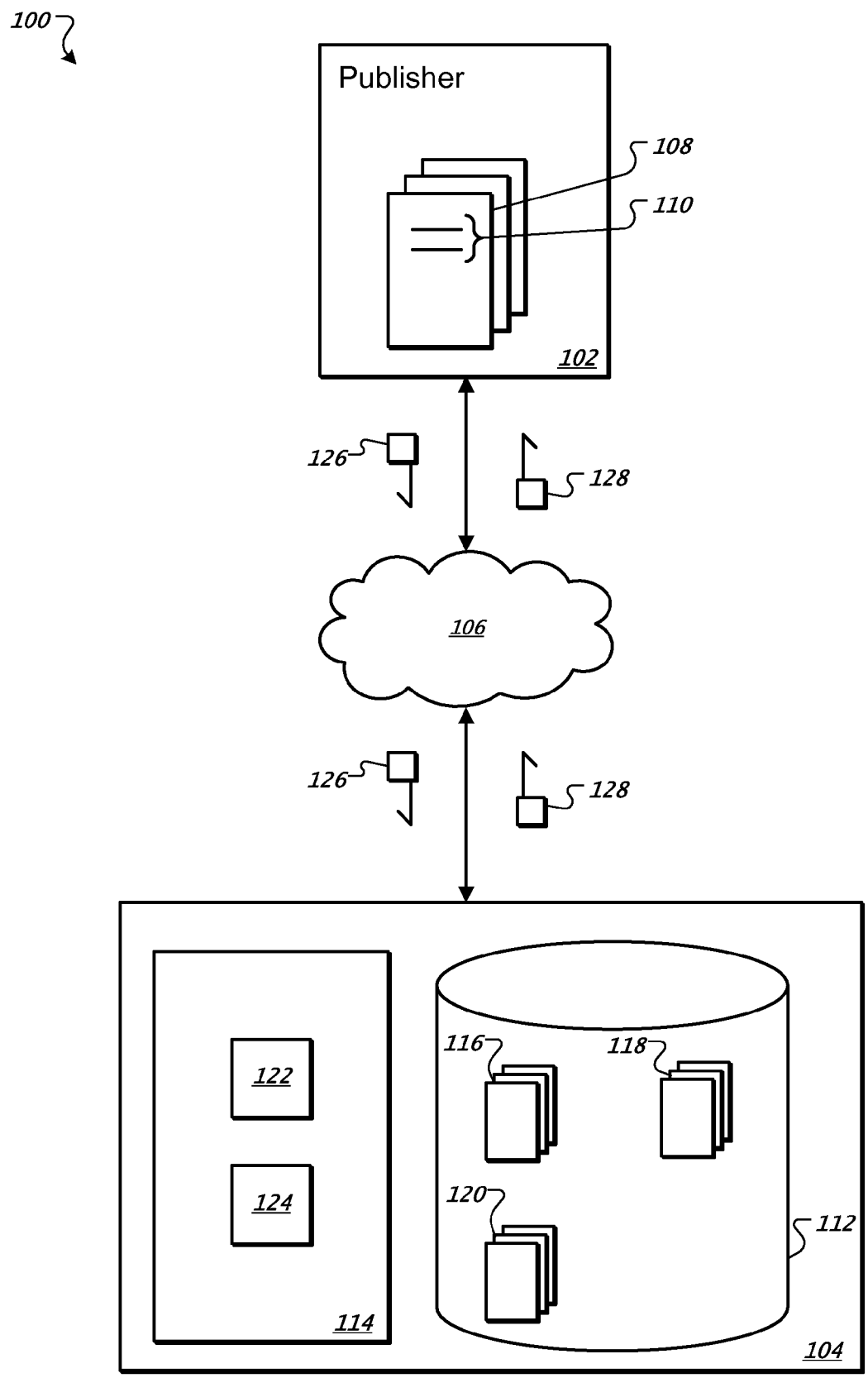
FIG. 1 is a block diagram illustrating an example system for embedding macros in accordance with some implementations of the present disclosure.

FIG. 1 illustrates an example system 100 for embedding macros associated with archiving advertisements displayed through Web pages. For example, the system 100 may automatically embed a click-tracking macro and a cache-busting macro (i.e., for substantially preventing caching of the advertisement in a client) in a Web page presenting a third-party advertisement. Macros may include a set of instructions that are represented by a string such that the string inserted in the source code is replaced by the set of instructions during compilation. In the illustrated example, the embedded macros may execute one or more of the following: cache busting; click url insertion; and/or other functions associated with monitoring user activity. To embed one or more macros, the system 100 may alter, replace, or otherwise modify a snippet in a Web page. Snippets typically include re-usable source code (e.g., HTML, Javascript) that may be incorporated into larger programming modules (e.g., Web Page). For example, a Web-page publisher may include snippets in Web pages to embed third-party advertisements. In this example, an advertiser may provide a snippet that when executed retrieves third-party advertisements to present through the Web page. In connection with advertising, the system 100 can, in some implementations, automatically embed one or more macros in a Web page by automatically modifying the snippets. For example, the system 100 may automatically modify a snippet to embed macros in response to at least a publisher updating a Web page with the snippet. As previously mentioned, the system 100 may modify snippets to automatically embed macros for archiving actions associated with third-party advertisements.

In general, snippets may be any of a plurality of different formats. For example, the different snippet formats may include standard IMG formats, floating Javascript formats, in-page IFRAME formats, expandable IFRAME formats from a plurality of different third-party vendors, and/or others. In some implementations, the system 100 can identify a format of a snippet from a plurality of identifiable formats and automatically modify the snippet to embed macros based, at least in part, on the identified format. In doing so, the system 100 may provide one or more of the following: automatically detect the vendor/type of creative for a rich media creative; automatically insert click-tracking, cache-busting and/or other macros into the rich media creative (e.g., snippet); support a wide variety of rules that are capable of handling different types of macros (e.g., Ad Manager, DFP); define insertion rules that are easy to write and maintain by non-engineers; and others. In addition, the system 100 may embed macros in a plurality of different snippet formats independent of modification or other input from a publisher. In this case, the publisher may not be required to understand the different snippet formats as well as specific rules for editing the different types of snippets to embed macros.

At a high level, the system 100 includes a publisher 102 coupled to an editing server 104 through a network 106. In the illustrated implementation, the publisher 102 locally stores and/or provides Web pages 108 to the network 106, and when the Web pages 108 are presented through a client (not illustrated), the client may retrieve a third-party advertisement in response to at least processing a snippet 110 in the Web page 108. The server 104 includes memory 112 and a processor 114. The memory 112 stores identification rules 118 including rules for determining snippet formats, and editing rules 120 including rules for modifying snippets 110 to embed macros associated with archiving actions associated with advertisements. The memory 112 also stores tree files 116 for identifying hierarchical data derived from snippets 110. The tree files 116 may be, for example, DOM trees or Javascript parse trees (i.e., parsed Javascript expression trees). The processor 114 includes a parser 122 for parsing snippets 110 to generate tree files 116 and editing engine 124 for modifying snippets 110 to embed macros based on the identification rules 118 and the editing rules 120. At a high level of operation, the publisher 102 may automatically transmit a request 126 to embed macros in a snippet 110 in response to at least updating a Web page 108 with the snippet 110. The parser 122 identifies the snippet 110 based, at least in part, on the request 126 and parses the snippet 110 to generate one or more tree files 116. In some implementations, the parser 122 may include an HTML parser and a Javascript parser (e.g., rhino). Rhino may include locations in the input text that expression nodes correspond to. The editing engine 124 determines a format of the snippet 110 from a plurality of identifiable snippet formats based, at least in part, on the identification rules 118. In addition, the editing engine 124 modifies the snippet 110 based on editing rules 120 associated with the identified snippet format. The editing engine 124 transmits a response 128 including the modified snippet 110 to the publisher 102 to embed macros into the Web page 108.

Turning to a more detailed description of the elements, the system 100 includes the publisher 102 that comprises an electronic computing device operable to receive, transmit, process and store data associated with system 100. In the illustrated embodiment, the publisher 102 provides the web pages 108 to clients (not illustrated) for display through GUIs. The Web pages 108 comprise displays through which an advertisement can be presented to users of clients using, for example, the snippets 110. In general, the Web pages 108 include any machine readable and machine storable work product that may generate or be used to generate a display through GUI. The Web pages 108 may be a file, a combination of files, one or more files with embedded links to other files, etc. The Web pages 108 may include text, audio, image, video, animation, and other attributes. In short, the Web pages 108 comprise any source code or object code for generating a display and providing instructions, using the snippet 110, for retrieving an advertisement to embed in the display.

The snippet 110 includes any parameters, pointers, variables, algorithms, instructions, rules, files, links, source or object code, objects, directives, and/or other data for easily providing trackable secondary content (e.g., images, text) for display through the Web page 108. For example, the snippet 110 may include a hyperlink for retrieving a third-party advertisement for display through the Web page 108 and a hyperlink for transmitting information to archive to a server (not illustrated). In regards to monitoring, the snippet 110 includes a target portion or portions that embed the one or more macros provided by the server 104. The target portion or portions of the snippet 110 may include or otherwise identify one or more of the following: one or more hyperlinks, parameters to a URL, Javascript variables, Javascript method arguments, Javascript function arguments, and/or others. In some implementations, the snippet 110 may include an HTML attribute string such as, for example, an A tag's HREF attribute or SCRIPT tag's SRC attribute. In some implementations, the snippet 110 may include one or more Javascript literal strings that are often assigned to a variable or passed to a function. For example, the snippet 110 may include the "clickTag" variable that may isolate the Javascript literal string it is assigned.

The editing server 104 comprises an electronic device operable to receive, transmit, process and store data associated with the system 100. The system 100 can be implemented using devices or computers other than servers, as well as a server pool. Indeed, the editing server 104 may be any computer or processing device such as, for example, a blade server, general-purpose personal computer (PC), Macintosh, workstation, Unix-based computer, or any other suitable device. In other words, the system 100 may include computers other than general purpose computers as well as computers without conventional operating systems. In computing device implementations, the editing server 104 may be adapted to execute any operating system including Linux, UNIX, Windows Server, or any other suitable operating system.

As mentioned above, the editing server 104, in this implementation, includes the memory 112 and the processor 114. The memory 112 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, the memory 112 includes the tree files 116, the identification rules 118 and the editing rules 120. Local memory 112 may also include any other appropriate data such as VPN applications or services, firewall policies, a security or access log, print or other reporting files, HTML files or templates, data classes or object interfaces, child software applications or sub-systems, and others.

The tree files 116 can include any one or more data entries and/or data structures that includes or otherwise identifies information based, at least in part, on parsed snippets 110. For example, the tree files 116 may include or otherwise identify both a DOM tree and a Javascript parse tree. In some implementations, the tree file 116 may include or otherwise identify a DOM tree based on the HTML code in the snippet 110. In some implementations, the tree file 116 include or otherwise identify a Javascript parse tree based on Javascript in the snippet 110. In general, the tree files 116 may identify one or more of the following: a hierarchy; a root node; child nodes; parent/child relationship between nodes; HTML tags; HTML attributes; Javascript variables; parameters to a Uniform Resource Locator (URL); Javascript method declarations; Javascript literal strings; and/or others. The tree file 116 may be associated with a single snippet 110 or multiple snippets 110 may be associated with the tree file 116. In some implementations, the tree file 116 can be associated a specific type of tree such as DOM or Javascript. In some implementations, the tree file 116 can be formatted, stored, or defined as various data structures in text files, XML documents, VSAM files, flat files, Btrieve files, CSV files, internal variables, or one or more libraries. In short, the tree file 116 can be stored to comprise one table or file or a plurality of tables or files stored on one computer or across a plurality of computers in any appropriate format. Moreover, the tree file 116 can be local or remote without departing from the scope of this disclosure and store any type of appropriate data.

The identification rules 118 include any identifying parameters, variables, URLs, algorithms, instructions, rules, objects or other directives for identifying a format of the snippet 110 from a plurality of different formats. For example, the identification rules 118 may be compared with HTML elements and/or Javascript elements to determine a format from a plurality of identifiable format. As previously mentioned, the plurality of different formats may include standard IMG formats, floating Javascript formats, in-page IFRAME formats, expandable IFRAME formats from a plurality of different third-party vendors and/or others. In some implementations, the identification rules 118 can include mathematical and/or logical expressions for determining a format of the snippet 110. For example, the identification rules 118 can include one or more logical expressions for determining whether a snippet 110 includes and/or omits various HTML elements and/or Javascript elements. In this case, the identification rule 118 may include criteria (e.g., strings) for comparing with the HTML elements and/or Javascript elements in the tree file 116 to determine if the specific elements are include and/or omitted. For example, the identification rules 118 may be used to determine whether an IFRAME element is present in the tree file 116 and that this element contains the SRC attribute and that the URL contained in this attribute contains the domain "ad.doubleclick.net". As another example, the identification rules 116 may be used to test whether a specific javascript variable, such as "clickTag1", is not present within the tree file 116. In some implementations, the identification rules 118 can be formatted, stored, or defined as various data structures in text files, XML documents, VSAM files, flat files, Btrieve files, CSV files, internal variables, or one or more libraries. In short, the identification rules 118 can be stored to comprise one table or file or a plurality of tables or files stored on one computer or across a plurality of computers in any appropriate format. Moreover, the identification rules 118 can be local or remote without departing from the scope of this disclosure and store any type of appropriate data.

The editing rules 120 include any parameters, variables, algorithms, instructions, rules, objects or other directives for editing at least a portion of the snippet 110. For example, the editing rule 120 may identify a target portion of the snippet 110 (e.g., string) and a string for replacing the target portion. In general, the editing rules 120 may include information for two processes: (1) criteria for identifying a target portion for a specific snippet format; and (2) instructions for modifying the target portion. In some implementations, the editing rule 120 may include one or more of the following: criteria for identifying a target portion; a format type; a macro identifier; an edit type; a pattern within the target portion on which to operate; and/or other information. In regards to identifying the target portion, the editing rule 120 may include a string that is compared to HTML elements and/or a Javascript elements. In some examples, the editing rule 120 may include the string "src" attribute of an iframe or script tag to identify the target portion. In some example, the editing rule 120 may include the string "var clickTag" to identify the literal string assigned to the clickTag variable in Javascript as the target portion. The edit types may include prepend, append, replace pattern, insert after pattern, insert before pattern, and/or other types. The macro identifier may include CACHEBUSTER, CLICK_URL_ESC, CLICK_URL_UNESC, CLICK_URL_ESC_ESC, and/or others. In some implementations, the editing rule 120 may be associated with a specific snippet format from a plurality of identifiable formats. In some implementations, the editing rules 120 can be formatted, stored, or defined as various data structures in text files, XML documents, VSAM files, flat files, Btrieve files, CSV files, internal variables, or one or more libraries. In short, the editing rules 120 can be stored to comprise one table or file or a plurality of tables or files stored on one computer or across a plurality of computers in any appropriate format. Moreover, the editing rules 120 can be local or remote without departing from the scope of this disclosure and store any type of appropriate data.

The processor 114 executes instructions and manipulates data to perform operations of the server 104. Although FIG. 1 illustrates a single processor 114 in the server 104, multiple processors 114 may be used according to particular needs, and reference to processor 114 is meant to include multiple processors 114 where applicable. In the illustrated implementation, the processor 114 executes the parser 122 and the editing engine 124. The parser 122 can be of the form of software, for example, operable to parse the snippets 110 to DOM trees and/or Javascript parse trees to generate associated tree files 116. For example, the parser 122 may identify a snippet 110 in a request 126 from the publisher 102 and generate one or more tree files 116 based, at least in part, on the identified snippet 110. In some implementations, the parser 122 may parse the snippet into a DOM tree and/or a Javascript parse tree based, at least in part, on the snippet 110 and generate one or more tree files 116 based, at least in part, on the DOM tree and/or the Javascript parse tree. In some implementations, the parser 122 may execute one or more of the following: receive a request from the publisher 102 to embed one or more tracking macros; identify a snippet 110 based, at least in part, on the received request 126; parse the HTML code in the snippet 110 to generate a DOM tree; parse the Javascript in the snippet 110 to generate a Javascript parse tree; generate a tree file 116 based on the DOM tree; generate a tree file 116 based on the Javascript parse tree; and/or other processes. In some implementations, the parser 122 may include a separate HTML parser and a separate Javascript parser (e.g., rhino).

The editing engine 124 can include any software for embedding one or more macros in snippets 110 based, at least in part, on editing rules 120. For example, the editing engine 124 may modify snippet 110 in accordance with an associated editing rule 120 to embed one or more macros. In some implementations, the editing engine 124 may execute one or more of the following: determine whether snippets 110 can be edited in accordance with editing rules 120 during format identification; identify an editing rule 120 based, at least in part, on a snippet format; identify a location of a target zone in the snippet 110 based, at least in part, on the editing rule 120; modify the target zone of the snippet 110 in accordance with the associated editing rule 120; transmit a response 128 including the modified snippet 110 to the publisher 102 for embedding the macros in the Web page 108; and/or others. In regards to identifying a snippet format, the editing engine 124 may process the snippet 110 to assist in identifying the format from a plurality of identifiable formats. For example, the editing engine 124 may process a copy of the snippet 110 to determine editing rules 120 that can be applied to the copy. In response to identifying a snippet format, the editing engine 124 may identify an editing rule 120 for the specific format. For example, the editing engine 124 may identify that the snippet 110 is a DoubleClick DFA Standard Image and determine that the editing rule 120 is assigned to the particular format. In regards to identifying a location of the target portion, the editing engine 124 may compare criteria from the editing rule 120 to the snippet 110 to determine a location of a string for editing. In some examples, the editing engine 124 may apply the string "iframe src" to the snippet 110 to identify the src attribute of an iframe tag. In some example, the editing engine 124 may apply the string "var clickTag" to snippet 110 to identify the literal string assigned to the clickTag variable in Javascript. In some implementations, the editing engine 124 may identify a location based on a path, an address or a definition in the hierarchy of the DOM tree and/or Javascript parse tree. As for embedding the one or more macros, the editing engine 124 may modify the target portion in accordance with the edit type identified in the editing rule 120. For example, the editing engine 124 may replace the target portion with a tracking macro (e.g., CLICK_URL_ESC). In response to modifying the snippet 110, the editing engine 124 may automatically transmit the snippet 110 including the modified target portion to the publisher 102 for embedding the macros in the Web page 108

Regardless of the particular implementation, "software" may include software, firmware, wired or programmed hardware, or any combination thereof as appropriate. Indeed, element engine 126 may be written or described in any appropriate computer language including C, C++, Java, J#, Visual Basic, assembler, Perl, PHP, as well as others. It will be understood that while the parser 122 and the editing engine 124 are illustrated in FIG. 1 as including individual modules the parser 122 and/or the editing engine 124 may include numerous other sub-modules or may instead be a single multi-tasked module that implements the various features and functionality through various objects, methods, or other processes. Further, while illustrated as internal to the content provider 104, one or more processes associated with the parser 122 and/or the editing engine 124 may be stored, referenced, or executed remotely. Moreover, the parser 122 and/or the editing engine 124 may be a child or sub-module of another software module or enterprise application (not illustrated) without departing from the scope of this disclosure.

The network 106 facilitates wireless or wireline communication between the server 104 and any other local or remote computer, such as the publisher 102. The network 106 may be all or a portion of an enterprise or secured network. While illustrated as a single network, the network 106 may be a continuous network logically divided into various sub-nets or virtual networks without departing from the scope of this disclosure, so long as at least portion of the network 106 may facilitate communications of the snippets 110 between the server 104 and the publisher 102. In some implementations, the network 106 encompasses any internal or external network, networks, sub-network, or combination thereof operable to facilitate communications between various components in the system 100. The network 106 may communicate, for example, Internet Protocol (IP) packets, Frame Relay frames, Asynchronous Transfer Mode (ATM) cells, voice, video, data, and other suitable information between network addresses. The network 106 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, the publisher 102 may automatically transmit a request 126 to embed one or more tracking macros in a snippet 110 in response to at least a user updating the Web page 108 with the snippet 110. For example, the user may update the Web page 108 with the snippet 110 to embed third-party advertisements, and in response to, for example, pasting the snippet 110 into a rich media text area, the publisher 102 may automatically transmit the embed request 126 to the server 104. In response to at least receiving the request 126, the parser 122 identifies the snippet 110 included in the request 126 and parses the snippet 110 into a DOM tree and/or Javascript parse tree. Based, at least in part, on the DOM tree and/or the Javascript parse tree, the parser 122 generates one or more tree files 116. Prior to modifying the snippet 110, the editing engine 124 identifies a format of the snippet 110 from a plurality of identifiable formats. The editing engine 124 may identify the format by comparing the identification rules 118 to the snippet 110. In some implementations, formats correspond to a single vendor/product. In some implementations, each identification rule 118 is associated with a different snippet format. In some implementations, the editing engine 124 can generate one or more copies of the snippet 110 and determine editing rules 120 that can be applied to the snippet 110 to facilitate the format identification process. In some cases, the snippet may satisfy all identification rules for a particular format. In response to identifying the snippet format, the editing engine 124 may identify rules 120 for modifying that specific format to embed the one or more macros. The editing engine 124 identifies a location of a target portion in the snippet 110 by, for example, comparing strings in the editing rule 120 to the code. After determining the location, the editing engine 124 modifies the target location in accordance with the editing rule 120 for the identified format to embed the one or more tracking macros. In connection with transmitting the snippet 110 including the modified target portion, the editing engine 120 may replace the macro with, for example, a hyperlink, executable code, and/or other elements. The editing engine 120 generates the reply 128 including the embedded macros. In some implementations, the publisher 102 may be prompted to accept the snippet 110 including the modified target portion prior to embedding the macros in the Web page 108. For example, a message or status may appear to a user proximate a text area requesting an indication whether the modified snippet 110 should be inserted automatically, and if so, the text in the text area may be replaced with the edited snippet 110.

FIGS. 2A and 2B are an example snippet 110 and a modified snippet 202 illustrating embedding a click-tracking macro. The illustrated snippets 110 and 202 are for example purposes only. Accordingly, the snippet 110 may be any other format and modified using other processes without departing from the scope of the disclosure.

Referring to FIG. 2A, the snippet 110 includes HTML code and Javascript. In the illustrated implementation, the snippet 110 includes a target portion 204 for embedding the click-tracking macro "CLICK_URL_UNESC." In connection with embedding the macro, a location of the target portion 204 is identified. For example, the editing engine 124 of FIG. 1 may identify the target portion by identifying the Javascript member gEbAd.interactions and/or the pattern ebN. In some cases, the editing engine 124 in this example may compare the criteria specified by the string "gEbAd.interactions" and/or "ebN" with the Javascript in the snippet 110. Referring to FIG. 2B, the modified snipped 202 includes the modified target portion 206. After identifying the location of the target portion, the value of placeholder "% c" proximate the pattern "ebN" was modified to embed the macro CLICK_URL_UNESC. Returning to the example, the editing engine 124 may identify a edit type and a macro based, at least in part, on an editing rule 120 for the snippet format. In the illustrated example, the edit type is replace and the macro is CLICK_URL_UNESC. The editing engine 124 replaced the string "% c" with the string "%% CLICK_URL_UNESC %%" to generate the modified target portion 206.

Figure 3:
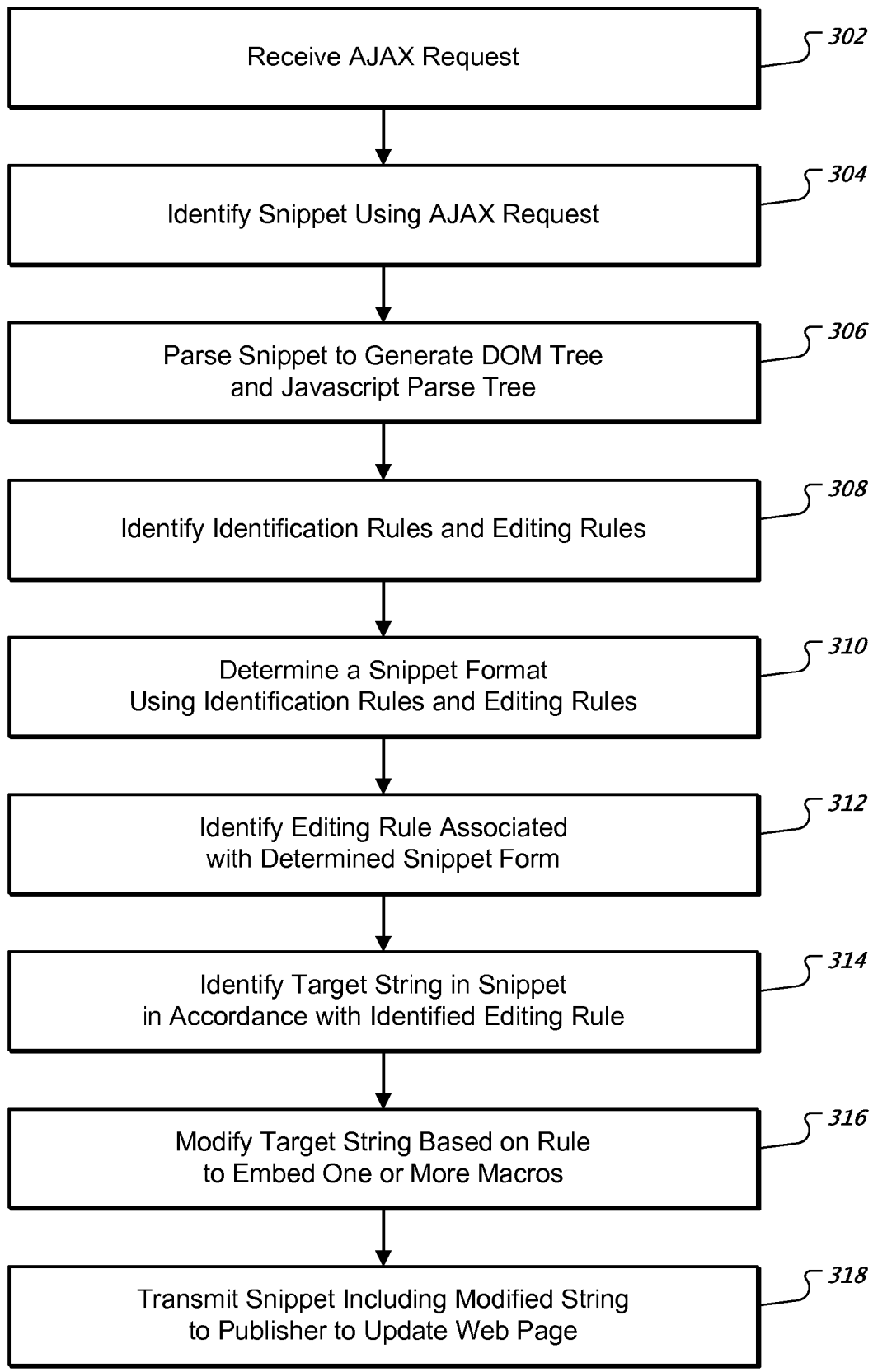
FIG. 3 is a flow chart illustrating an example method for embedding macros in third-party advertisements.

FIG. 3 is a flowchart illustrating an example method 300 for automatically embedding one or more macros in a snippet for archiving user activity associated with a third-party advertisement. Generally, the method 300 describes an example technique where a snippet is modified based, at least in part, on a format determined from a plurality of identifiable snippet formats. By way of example, the method 300 can be executed by the system 100 using any appropriate combination and arrangement of logical elements implementing some or all of the described functionality.

The method 300 begins at step 302 where an Asynchronous JavaScript and XML (AJAX) request including a snippet is received. For example, the parser 122 of FIG. 1 may receive an AJAX request 126 including the snippet 110. In this example, the publisher 102 may automatically transmit the AJAX request 126 in response to at least the publisher 102 updating the Web page 108 with the snippet 110. In response to at least receiving the AJAX request, a snippet is identified using the snippet at step 304. In the example, the parser 122 may identify the snippet 110 based, at least in part, on the request 126. At step 306, the snippet is parsed to generate a DOM tree for the HTML code and one or more Javascript parse trees for the Javascript in the snippet. Again in the example, the parser 122 may parse the identified snippet 110 to generate a DOM tree for the HTML code using, for example, tagsoup and a Javascript parse tree for each portion of Javascript in the snippet 110. In this example, the parser 122 may generate one or more tree files 116 based, at least in part, on the DOM tree and/or the Javascript parse tree. In connection with generating the DOM tree and the Javascript parse tree, identification rules and editing rules are identified at step 308. Returning to the example, the editing engine 124 may identify identification rules 118 for identifying the format of the snippet 110 and editing rules 120. As previously mentioned, the editing engine 124 may apply the editing rules 120 to a copy of the snippet 110 in the process of identifying the format of the snippet 110. Next, at step 310, a snippet format is determined from a plurality of identifiable snippet formats based, at least in part, on the snippet, the identification rules, and the editing rules. In the example, the editing engine 120 may compared criteria for the different formats to the snippet 110 and determine editing rules 120 that can be applied to a copy of the snippet 110.

In response to at least determining the snippet format, editing rules for the snippet format are identified at step 312. Again returning to the example, the editing engine 124 may map the identified snippet format to an editing rule 120 for embedding at least one macro in the snippet 110. In some implementations, each of the plurality of identifiable snippet formats is assigned to a different editing rule 120. At step 314, a target string for embedding the one or more macros is located in accordance with the identified editing rule. As for the example, the editing engine 124 may identify the target string by comparing criteria from the identified editing rule 120 to the snippet 110. In this example, the editing engine 124 may identify the location based on an HTML attribute, a Javascript literal string, and/or other criteria. Next, at step 316, the target string is modified to embed one or more macros based, at least in part, on the identified editing rule. Again returning to the example, the editing engine 124 may identify an edit type and the one or more macros in the editing rule 120 and edit the target string in accordance with the edit type and the one or more macros. The snippet, including the embedded macros, is transmitted to the publisher to update the associated Web page at step 318. In the example, the editing engine 124 transmits the modified snippet 202 including the modified target string 206 to the publisher 102 to embed the macros in the Web page 108.

Although this disclosure has been described in terms of certain implementations and generally associated methods, alterations and permutations of these implementations and methods will be apparent to those skilled in the art.

What is claimed is:

1. A method comprising:
   receiving, from a publisher computing device, at a server computing device, a snippet embedded in a Web page;
   determining, by the server computing device, a format of the received snippet from a plurality of identifiable formats based, at least in part, on identification rules;
   selecting editing rules, based on the format of the received snippet, for embedding one or more macros in the received snippet,
      wherein the editing rules include (i) criteria for identifying a target portion of the received snippet, and
      (ii) first instructions for modifying the identified target portion, wherein the first instructions include at least one of a macro identifier, an edit type, and a string for modifying the identified target portion,
      wherein the one or more macros are associated with archiving user actions associated with an advertisement presented in the Web page and wherein each of the one or more macros includes a value of a placeholder for second instructions that modify the snippet;
   automatically embedding, by the server computing device, the one or more macros in the received snippet in accordance with the selected editing rules; and
   transmitting the received snippet, including the embedded one or more macros, to the publisher computing device to be embedded in the Web page.

2. The method of claim 1, wherein determining the format of the snippet comprises determining the snippet format including comparing at least portions of the snippet to criteria associated with the plurality of identifiable formats.

3. The method of claim 1, wherein the snippet format identifies a type of the advertisement to be presented in the Web page.

4. The method of claim 1, wherein the one or more macros includes a first macro for archiving activities of a user interacting with the advertisement and a second macro for preventing caching of the advertisement in a client.

5. The method of claim 1, further comprising:
   parsing the snippet to generate a Document Object Model (DOM) tree and a parsed Javascript expression tree;
   determining a target portion in the snippet based, at least in part, on the editing rules and the DOM tree and the parsed Javascript expression tree; and
   modifying the target portion in accordance with the editing rules.

6. The method of claim 5, wherein the target portion is determined based, at least in part, on one of a path, an address or a definition in a hierarchy.

7. The method of claim 5, wherein modifying the target portion comprises replacing at least a substring of the target portion.

8. The method of claim 7, wherein the snippet includes HyperText Markup Language (HTML) and Javascript.

9. The method of claim 1, wherein the snippet is received in an Asynchronous Javascript And XML (AJAX) request.

10. The method of claim 1, wherein the macro identifier identifies the one or more macros to be embedded in the received snippet and the edit type is at least one of prepend, append, replace after a pattern, insert after the pattern, and insert before the pattern.

11. The method of claim 1, wherein the string is for replacing the identified target portion.

12. A computer program product comprising a non-transitory computer-usable storage medium storing computer-readable instructions operable when executed by a server computing device to:
   receive, from a publisher computing device, a snippet embedded in a Web page;
   determine a format of the received snippet from a plurality of identifiable formats based, at least in part, on identification rules;
   select editing rules, based on the format of the received snippet, for embedding one or more macros in the received snippet,
      wherein the editing rules include (i) criteria for identifying a target portion of the received snippet, and
      (ii) first instructions for modifying the identified target portion, wherein the first instructions include at least one of a macro identifier, an edit type, and a string for modifying the identified target portion,
      wherein the one or more macros are associated with archiving user actions associated with an advertisement presented in the Web page and wherein each of the one or more macros includes a value of a placeholder for second instructions that modify the snippet;
   automatically embed the one or more macros in the received snippet in accordance with the selected editing rules; and
   transmit the received snippet, including the embedded one or more macros, to the publisher computing device to be embedded in the Web page.

13. The computer program product of claim 12, wherein the computer-readable instructions operable to determine the format of the snippet comprise computer-readable instructions operable to determine the snippet format including comparing at least portions of the snippet to criteria associated with the plurality of identifiable formats.

14. The computer program product of claim 12, wherein the snippet format identifies a type of the advertisement to be presented in the Web page.

15. The computer program product of claim 12, wherein the one or more macros includes a first macro for archiving activities of a user interacting with the advertisement and a second macro for preventing caching of the advertisement in a client.

16. The computer program product of claim 12, further operable to:
    parse the snippet to generate a Document Object Model (DOM) tree and a parsed Javascript expression tree;
    determine a target portion in the snippet based, at least in part, on the editing rules and the DOM tree and the parsed Javascript expression tree; and
    modify the target portion in accordance with the one or more editing rules.

17. The computer program product of claim 16, wherein the target portion is determined based, at least in part, on one of a path, an address or a definition in a hierarchy.

18. The computer program product of claim 16, wherein the computer-readable instructions operable to modify the target portion comprise computer-readable instructions operable to replace at least a substring of the target portion.

19. The computer program product of claim 18, wherein the snippet includes HTML and Javascript.

20. The computer program product of claim 12, wherein the snippet is received in an AJAX request.

21. A system, comprising:
    a server computing device operable to:
        receive, from a publisher computing device, a snippet embedded in a Web page;
        determine a format of the received snippet from a plurality of identifiable formats based, at least in part, on identification rules;
        select editing rules, based on the format of the received snippet, for embedding one or more macros in the received snippet,
            wherein the editing rules include (i) criteria for identifying a target portion of the received snippet, and
            (ii) first instructions for modifying the identified target portion, wherein the first instructions include at least one of a macro identifier, an edit type, and a string for modifying the identified target portion,
        wherein the one or more macros are associated with archiving user actions associated with an advertisement presented in the Web page and wherein each of the one or more macros includes a value of a placeholder for second instructions that modify the snippet;
        automatically embed the one or more macros in the received snippet in accordance with the selected editing rules; and
        transmit the received snippet, including the embedded one or more macros, to the publisher computing device to be embedded in the Web page.

* * * * *